US007840186B2

(12) United States Patent
Franson (10) Patent No.: US 7,840,186 B2
(45) Date of Patent: Nov. 23, 2010

(54) WIRELESS SATA/SAS DATA TRANSFER SYSTEM

(75) Inventor: Steven J. Franson, Scottsdale, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 710 days.

(21) Appl. No.: 11/860,942

(22) Filed: Sep. 25, 2007

(65) Prior Publication Data
US 2009/0080562 A1 Mar. 26, 2009

(51) Int. Cl.
*H04B 7/00* (2006.01)
*H04B 1/38* (2006.01)
*G06F 3/06* (2006.01)

(52) U.S. Cl. ............... 455/41.3; 455/557; 455/41.2; 711/4

(58) Field of Classification Search ........... 455/41.3, 455/41.2, 456.1, 557, 3.06; 709/224, 223, 709/211; 375/286, 269; 711/4
See application file for complete search history.

(56) References Cited

U.S. PATENT DOCUMENTS

| | | | |
|---|---|---|---|
| 6,944,733 B2 | 9/2005 | Zamer | |
| 6,976,073 B2 | 12/2005 | Desoli et al. | |
| 7,058,749 B2 | 6/2006 | Loffink | |
| 7,069,466 B2 | 6/2006 | Trimmer et al. | |
| 7,167,975 B2 | 1/2007 | Hamdi et al. | |
| 2004/0215421 A1 | 10/2004 | Schmitz et al. | |
| 2006/0095630 A1 | 5/2006 | Bashford et al. | |
| 2007/0205867 A1* | 9/2007 | Kennedy et al. | 340/10.1 |
| 2007/0214277 A1 | 9/2007 | Ahmed et al. | |

FOREIGN PATENT DOCUMENTS

KR    20-2006-0410067 Y1    3/2006

OTHER PUBLICATIONS

Song Hak Shim, "PCT International Search Report and Written Opinion," WIPO, ISA/KR, Korean intellectual Property Office, Daejeon, Republic of Korea, Dec. 19, 2008.
"Reference Data for Engineer: Radio, Electronics, Computer, and Communications", Seventh Edition, Howard W. Sams & Co., 1985, pp. 23-3-23-5.
"External Serial ATA—White Paper", Silicon Image, Inc., Sunnyvale, CA, 2004.

* cited by examiner

*Primary Examiner*—Eugene Yun (57) ABSTRACT

A wireless data transfer system. The system includes a first hard disk, a first hard disk interface, and a first transmitter. The first hard disk interface is configured to retrieve first read data from the first hard disk and to create a first bit serial signal from the retrieved first read data. The first bit serial signal conforms to a protocol selected from the group consisting of serial advanced technology attachment (SATA) protocol and serial attached small computer system interface (SAS) protocol. The first transmitter is configured to operate at selected carrier frequency greater than 50 GHz, comprising, to operate at effective isotropic radiated power level less than or equal to 40 dBm, to receive the first bit serial signal from the first hard disk interface, to modulate the first bit serial signal using amplitude shift keying modulation to substantially create directly a first signal, and to transmit the first signal.

21 Claims, 4 Drawing Sheets

WIRELESS SATA/SAS DATA TRANSFER SYSTEM

BACKGROUND

Serial Advanced Technology Architecture (SATA) is an emerging interface technology used to connect hard disks and other peripherals to a personal computer (PC). This interface is an evolutionary replacement for the older Parallel ATA (PATA) physical storage interface which was previously called Integrated Drive Electronics (IDE). Several improvements to parallel ATA have extended its data transfer rate from an initial 3.3 Megabytes per second (MB/s) to 100 MB/s. However, in the past few years personal computer performance and hard disk drive read/write data rates are now capable of exceeding the 100 MB/s rate. With this increase in performance, the hard disk market has shifted such that a large percentage of hard disk drives now being produced use SATA technology.

At the same time that this increase in read/write data rates for hard disk drives has taken place, consumers have become increasingly interested in storing larger and larger files. A file for a movie, for example, can require several Gigabytes (GB/s) of storage. Movies in the newer high definition formats require even more storage space. The hard disk could be, for example, the storage device on a personal computer, a hard disk external to the computer, or a Digital Video Recorder (DVR). For purposes of back-up, long term storage, convenience of use, modification, and the like, files are often transferred from one storage device to another. For example, a user might transfer a movie file recorded on a DVR to a personal computer's hard disk for viewing on the computer and then to an external hard disk for long term storage.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

As shown in the drawings for purposes of illustration, novel techniques are disclosed herein for high-speed wireless data transfer systems. The systems disclosed can transfer data in the Serial Advanced Technology Architecture (SATA) protocol from a data source to a another device which uses the SATA protocol. In an alternative embodiment, the serial attached small computer system interface (SAS) protocol can be used instead of the SATA protocol. These techniques are capable of transferring data at speeds comparable to that of the read/write speeds of hard disks which is especially important in the transfer of large files from one storage system to another.

In various representative embodiments, data can be transferred wirelessly between hard disks on various systems of wirelessly coupled devices. Such systems could include, for example, (1) a digital video recorder (DVR) wirelessly coupled to a computer, (2) an external hard disk wirelessly coupled to a computer, (3) a cell phone wirelessly coupled to a computer, (4) a video camera wirelessly coupled to a computer, (5) two computers wirelessly coupled to each other, (6) two DVR's wirelessly coupled to each other, (7) two external hard disks wirelessly coupled to each other, (8) two cell phones wirelessly coupled to each other, (9) two video cameras wirelessly coupled to each other, (10) a digital video recorder (DVR) wirelessly coupled to an external hard disk, (11) a digital video recorder (DVR) wirelessly coupled to a cell phone, (12) a digital video recorder (DVR) wirelessly coupled to a video camera, (13) an external hard disk wirelessly coupled to a cell phone, (14) an external hard disk wirelessly coupled to a video camera, (15) a cell phone wirelessly coupled to a video camera, and the like. In addition, data can be simultaneously transferred wirelessly between a source hard disk and multiple target hard disks for, among others, any of the above combinations.

While systems are available for the transfer of data from one data storage device to another at speeds comparable to that of the read/write speeds of hard disks, these systems have relied upon wired interconnections. But, in many cases wired interconnections may not be possible or may not be convenient. Previous techniques for the wireless transfer of data have relied upon converting the data format from one protocol to another using, for example, a media access control (MAC) layer. Such conversion significantly reduces the rate of data transfer, adds cost, and consumes system resources.

While the representative embodiments disclosed herein are described in terms of radio frequency (RF) wireless devices, it will be understood by one of ordinary skill in the art that other communication technologies such as optical and infrared communications can also be used. In the following detailed description and in the several figures of the drawings, like elements are identified with like reference numerals.

Figure 1:
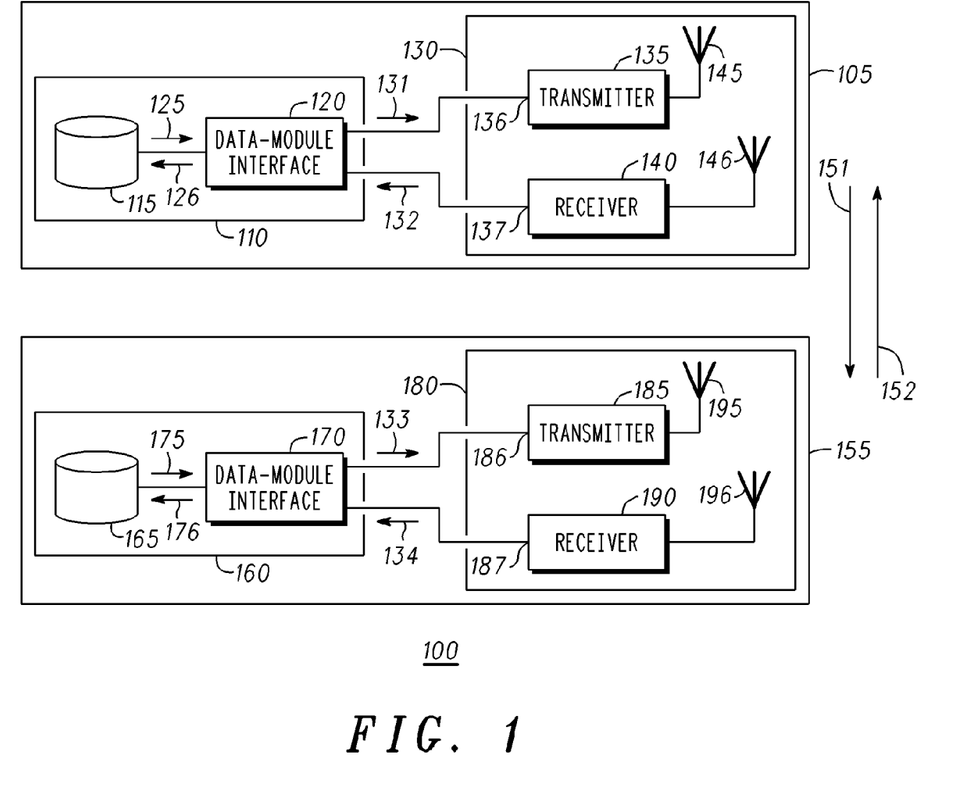
FIG. 1 is a block diagram of a wireless data transfer system as described in various representative embodiments.

FIG. 1 is a block diagram of a wireless data transfer system 100 as described in various representative embodiments. In FIG. 1, the wireless data transfer system 100 comprises a first wireless data transfer device 105 and a second wireless data transfer device 155. The first wireless data transfer device 105 comprises a first data module 110 and a first communication module 130. The first data module 110 comprises a first storage device 115, which in more specific embodiments may be a first hard disk 115, and a first data-module interface 120, which in more specific embodiments may be a first hard disk interface 120. The first communication module 130 comprises a first transmitter 135, a first receiver 140, a first transmitter antenna 145, and a first receiver antenna 146. The second wireless data transfer device 155 comprises a second data module 160 and a second communication module 180. The second data module 160 comprises a second data storage device 165, which in more specific embodiments may be a second hard disk 165, and a second data-module interface 170, which in more specific embodiments may be a second hard disk interface 170. The second communication module 180 comprises a second transmitter 185, a second receiver 190, a second transmitter antenna 195, and a second receiver antenna 196.

The first data storage device 115 is coupled to the first data-module interface 120; the first data-module interface 120 is coupled to the input of the first transmitter 135 at first transmitter input 136 and to the output of the first receiver 140 at first receiver output 137; the output of the first transmitter 135 is coupled to the first transmitter antenna 145; and the input of the first receiver 140 is coupled to the first receiver antenna 146. The second data storage device 165 is coupled to the second data-module interface 170; the second data-module interface 170 is coupled to the input of the second transmitter 185 at second transmitter input 186 and to the output of the second receiver 190 at second receiver output 187; the output of the second transmitter 185 is coupled to the second transmitter antenna 195; and the input of the second receiver 190 is coupled to the second receiver antenna 196.

When the first wireless data transfer device 105 is in a data transmission mode, the first data-module interface 120 retrieves first read data 125 from the first data storage device 115 and creates a first bit serial signal 131 from the retrieved first read data 125. The created first bit serial signal 131 conforms to a protocol selected from the group comprising the serial advanced technology attachment (SATA) protocol and the serial attached small computer system interface (SAS) protocol. Operating at a selected carrier frequency greater than 50 GHz and an effective isotropic radiated power level less than or equal to 40 dBm, the first transmitter 135 receives the first bit serial signal 131 from the first data-module interface 120 at the first transmitter input 136. The first transmitter 135 modulates the first bit serial signal 131 using amplitude shift keying (ASK) modulation to substantially generate directly a first signal 151 and then transmits the first signal 151 via the first transmitter antenna 145 which is coupled to the output of the first transmitter 135. Amplitude shift keying is a modulation technique well known to one of ordinary skill in the art. This modulation technique represents digital data by means of variations in the amplitude of a carrier wave. The level of the amplitude represents binary logic 0s and 1s. In its simplest form, i.e., on-off keying, the carrier wave is switched on and off to represent, for example, a logic 0 in the absence of the carrier and a logic 1 in the presence of the carrier.

When the second wireless data transfer device 155 is in a data reception mode, the second receiver 190 operating at the same carrier frequency as the first transmitter 135 receives the first signal 151 from the first wireless data transfer device 105 via the second receiver antenna 196 and demodulates the first signal 151 using amplitude shift keying demodulation to substantially create directly a fourth bit serial signal 134 from the first signal 151. The created fourth bit serial signal 134 conforms to the selected protocol (SATA or SAS). The second data-module interface 170 receives the fourth bit serial signal 134 from the second receiver 190 at the second receiver output 187. The second data-module interface 170 appropriately modifies the fourth bit serial signal 134 for storage creating, thereby, second write data 176. Second write data 176 is then stored on the second data storage device 165.

When the second wireless data transfer device 155 is in a data transmission mode, the second data-module interface 170 retrieves second read data 175 from the second data storage device 165 and creates a third bit serial signal 133 from the retrieved second read data 175. The created third bit serial signal 133 conforms to a protocol selected from the group comprising the serial advanced technology attachment (SATA) protocol and the serial attached small computer system interface (SAS) protocol. Operating at a selected carrier frequency greater than 50 GHz and an effective isotropic radiated power level less than or equal to 40 dBm, the second transmitter 185 receives the third bit serial signal 133 from the second data-module interface 170 at the second transmitter input 186. The second transmitter 185 modulates the third bit serial signal 133 using amplitude shift keying modulation to substantially generate directly a second signal 152 and then transmits the second signal 152 via the second transmitter antenna 195 which is coupled to the output of the second transmitter 185.

When the first wireless data transfer device 105 is in a data reception mode, the first receiver 140 receives the second signal 152 from the second wireless data transfer device 155 via the first receiver antenna 146 and demodulates the second signal 152 using amplitude shift keying demodulation to substantially create directly a second bit serial signal 132 from the second signal 152. The created second bit serial signal 132 conforms to the selected protocol (SATA or SAS). The first data-module interface 120 receives the second bit serial signal 132 from the first receiver 140 at the first receiver output 137. The first data-module interface 120 appropriately modifies the second bit serial signal 132 for storage creating, thereby, first write data 126. First write data 126 is then stored on the first data storage device 115.

In various representative embodiments, FIG. 1 shows wireless data transfer systems 100 in which data can be transferred wirelessly between hard disks on various systems of wirelessly coupled data storage devices 115,165. Such systems 100 could include, for example, (1) a digital video recorder (DVR) wirelessly coupled to a computer, (2) an external hard disk wirelessly coupled to a computer, (3) a cell phone wirelessly coupled to a computer, (4) a video camera wirelessly coupled to a computer, (5) two computers wirelessly coupled to each other, (6) two DVR's wirelessly coupled to each other, (7) two external hard disks wirelessly coupled to each other, (8) two cell phones wirelessly coupled to each other, (9) two video cameras wirelessly coupled to each other, (10) a digital video recorder (DVR) wirelessly coupled to an external hard disk, (11) a digital video recorder (DVR) wirelessly coupled to a cell phone, (12) a digital video recorder (DVR) wirelessly coupled to a video camera, (13) an external hard disk wirelessly coupled to a cell phone, (14) an external hard disk wirelessly coupled to a video camera, (15) a cell phone wirelessly coupled to a video camera, and the like. In addition, data can be simultaneously transferred wirelessly between a source hard disk and multiple target hard disks for, among others, any of the above combinations. Using additional wireless data transfer devices 105,155 as needed, data can be simultaneously transferred wirelessly between a source storage device, for example first storage device 115, and multiple target storage devices, for example multiple second storage devices 165.

In representative embodiments wherein the first data storage device 115 is first hard disk 115, the second data storage device 165 is second hard disk 165, the first data-module interface 120 is first hard disk controller 120 and the second data-module interface 170 is second hard disk controller 170, FIG. 1 shows wireless data transfer systems 100 in which data can be transferred wirelessly between hard disks on various systems of wirelessly coupled data storage devices 115,165. Such systems could include, for example, (1) two DVR's wirelessly coupled to each other, (2) two external hard disks wirelessly coupled to each other, (3) two cell phones wirelessly coupled to each other, (4) two video cameras wirelessly coupled to each other, (5) a digital video recorder (DVR) wirelessly coupled to an external hard disk, (6) a digital video recorder (DVR) wirelessly coupled to a cell phone, (7) a digital video recorder (DVR) wirelessly coupled to a video camera, (8) an external hard disk wirelessly coupled to a cell phone, (9) an external hard disk wirelessly coupled to a video camera, (10) a cell phone wirelessly coupled to a video camera, and the like. In addition, data can be simultaneously transferred wirelessly between a source hard disk and multiple target hard disks for, among others, any of the above combinations. Using additional wireless data transfer devices 105,155 as needed, data can be simultaneously transferred wirelessly between a source storage device, for example first data storage device 115, and multiple target storage devices, for example multiple second data storage devices 165.

Figure 2:
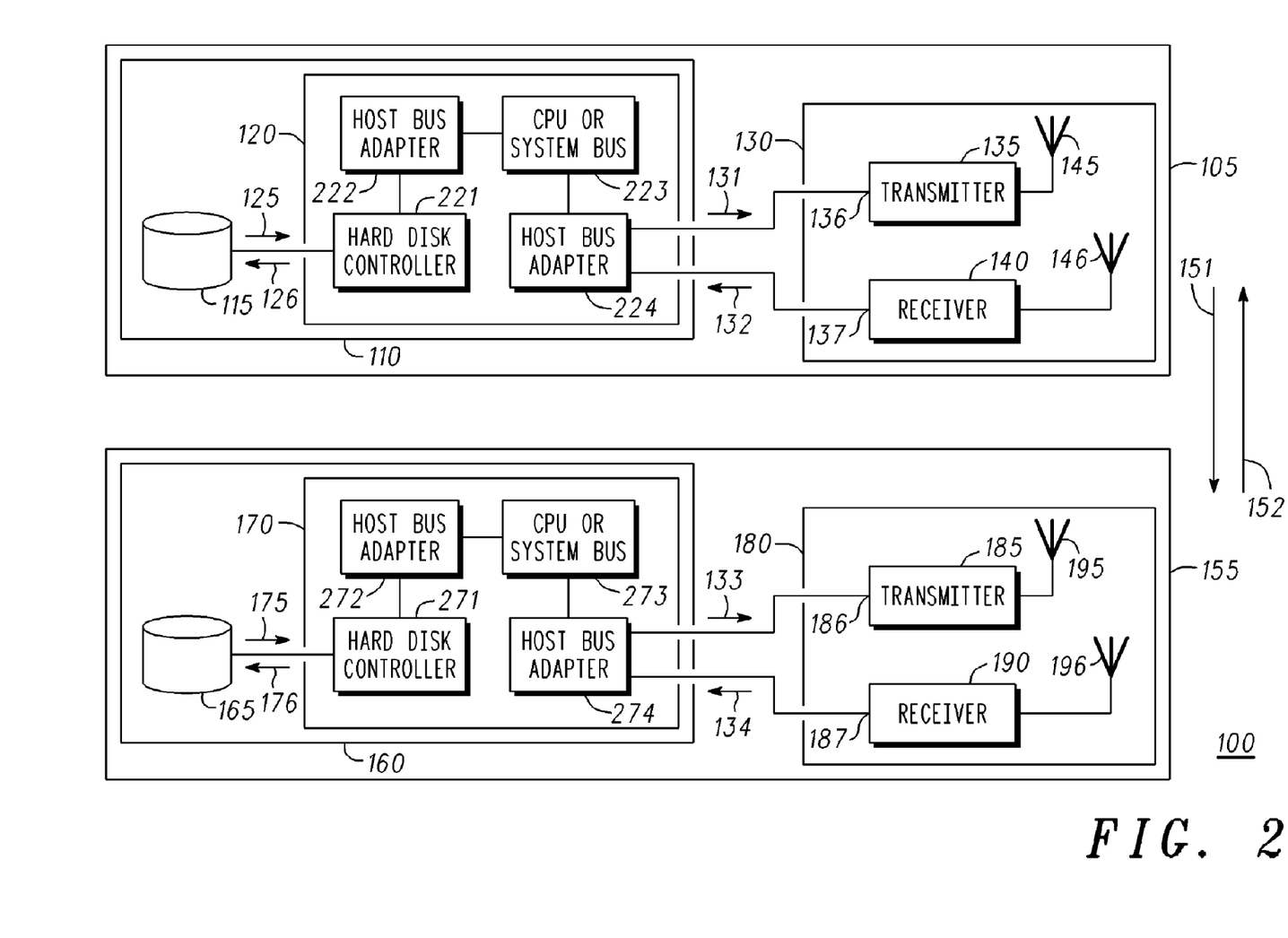
FIG. 2 is a block diagram of another wireless data transfer system as described in various representative embodiments.

FIG. 2 is a block diagram of another wireless data transfer system 100 as described in various representative embodiments. The wireless data transfer system 100 of FIG. 2 is similar to the wireless data transfer system 100 of FIG. 1 with the following exceptions: the first hard disk interface 120 comprises a first hard disk controller 221, a first first-host bus adapter 222, a first central processing unit (first CPU) 223, and a second first-host bus adapter 224, and the second hard disk interface 170 comprises a second hard disk controller 271, a first second-host bus adapter 272, a second central processing unit (second CPU) 273, and a second second-host bus adapter 274. In an alternative embodiment, the first CPU 223 is replaced with a first system bus 223. And in another embodiment, the second CPU 273 is replaced with a second system bus 273. And in still another alternative embodiment, the first CPU 223 is replaced with a first system bus 223, and the second CPU 273 is replaced with a second system bus 273.

The first hard disk 115 is coupled to the first hard disk controller 221 in the first hard disk interface 120; the first hard disk controller 221 is coupled to the first first-host bus adapter 222; the first first-host bus adapter 222 is coupled to the first central processing unit 223; the first central processing unit 223 is coupled to the second first-host bus adapter 224; the second first-host bus adapter 224 is coupled to the input of the first transmitter 135 at first transmitter input 136 and to the output of the first receiver 140 at first receiver output 137; the output of the first transmitter 135 is coupled to the first transmitter antenna 145; and the input of the first receiver 140 is coupled to the first receiver antenna 146. The second hard disk 165 is coupled to the second hard disk controller 271 in the second hard disk interface 170; the second hard disk controller 271 is coupled to the first second-host bus adapter 272; the first second-host bus adapter 272 is coupled to the second central processing unit 273; the second central processing unit 273 is coupled to the second second-host bus adapter 274; the second second-host bus adapter 274 is coupled to the input of the second transmitter 185 at second transmitter input 186 and to the output of the second receiver 190 at second receiver output 187; the output of the second transmitter 185 is coupled to the second transmitter antenna 195; and the input of the second receiver 190 is coupled to the second receiver antenna 196.

When the first wireless data transfer device 105 of FIG. 2 is in a data transmission mode, its operation is similar to that described above for FIG. 1 except as follows: the first hard disk controller 221 retrieves first read data 125 from the first hard disk 115 and creates a first bit serial signal 131 from the retrieved first read data 125; the first bit serial signal 131 is transferred to the first CPU 223 via the first first-host bus adapter 222; and the first bit serial signal 131 is transferred from the first CPU 223 via the second first-host bus adapter 224 to the first transmitter 135 at the first transmitter input 136. As with the first wireless data transfer device 105 of FIG. 1, the created first bit serial signal 131 conforms to a protocol selected from the group comprising the serial advanced technology attachment (SATA) protocol and the serial attached small computer system interface (SAS) protocol, and the first transmitter 135 operates at a selected carrier frequency greater than 50 GHz and an effective isotropic radiated power level less than or equal to 40 dBm. The first transmitter 135 receives the first bit serial signal 131 from the first hard disk interface 120 at the first transmitter input 136. The first transmitter 135 modulates the first bit serial signal 131 using amplitude shift keying modulation to substantially generate directly a first signal 151 and then transmits the first signal 151 via the first transmitter antenna 145 which is coupled to the output of the first transmitter 135.

As in FIG. 1, when the second wireless data transfer device 155 of FIG. 2 is in a data reception mode operating at the same carrier frequency as the first transmitter 135, the second receiver 190 receives the first signal 151 from the first wireless data transfer device 105 via the second receiver antenna 196 and demodulates the first signal 151 using amplitude shift keying demodulation to substantially create directly a fourth bit serial signal 134 from the first signal 151. The created fourth bit serial signal 134 conforms to the selected protocol (SATA or SAS). In FIG. 2, the second second-host bus adapter 274 in the second hard disk interface 170 receives the fourth bit serial signal 134 from the second receiver 190 at the second receiver output 187. The fourth bit serial signal 134 is transferred to the second CPU 273 by the second second-host bus adapter 274; the fourth bit serial signal 134 is transferred to the second hard disk controller 271 via the first second-host bus adapter 272; and the second hard disk controller 271 appropriately modifies the fourth bit serial signal 134 for storage creating, thereby, second write data 176. Second write data 176 is then stored on the second hard disk 165. As with the embodiment of FIG. 1, the created fourth bit serial signal 134 conforms to the selected protocol (SATA or SAS).

When the second wireless data transfer device 155 of FIG. 2 is in a data transmission mode, its operation is similar to that described above for FIG. 1 except as follows: the second hard disk controller 271 retrieves second read data 175 from the second hard disk 165 and creates a third bit serial signal 133 from the retrieved second read data 175; the third bit serial signal 133 is transferred to the second CPU 273 via the first second-host bus adapter 272; and the third bit serial signal 133 is transferred from the second CPU 273 via the second second-host bus adapter 274 to the second transmitter 185 at the second transmitter input 186. As with the second wireless data transfer device 155 of FIG. 1, the created third bit serial signal 133 conforms to a protocol selected from the group comprising the serial advanced technology attachment (SATA) protocol and the serial attached small computer system interface (SAS) protocol, and the second transmitter 185 operates at a selected carrier frequency greater than 50 GHz and an effective isotropic radiated power level less than or equal to 40 dBm. The second transmitter 185 receives the third bit serial signal 133 from the second hard disk interface 170 at the second transmitter input 186. The second transmitter 185 modulates the third bit serial signal 133 using amplitude shift keying modulation to substantially generate directly a second signal 152 and then transmits the second signal 152 via the second transmitter antenna 195 which is coupled to the output of the second transmitter 185.

As in FIG. 1, when the first wireless data transfer device 105 of FIG. 2 is in a data reception mode operating at the same carrier frequency as the second transmitter 185, the first receiver 140 receives the second signal 152 from the second wireless data transfer device 155 via the first receiver antenna 146 and demodulates the second signal 152 using amplitude shift keying demodulation to substantially create directly a second bit serial signal 132 from the second signal 152. The created second bit serial signal 132 conforms to the selected protocol (SATA or SAS). In FIG. 2, the second first-host bus adapter 254 in the first hard disk interface 120 receives the second bit serial signal 132 from the first receiver 140 at the first receiver output 137. The second bit serial signal 132 is transferred to the first CPU 223 by the second first-host bus adapter 224; the second bit serial signal 132 is transferred to the first hard disk controller 221 via the first first-host bus adapter 222; and the first hard disk controller 221 appropriately modifies the second bit serial signal 132 for storage creating, thereby, first write data 126. First write data 126 is then stored on the first hard disk 115. As with the embodiment of FIG. 1, the created second bit serial signal 132 conforms to the selected protocol (SATA or SAS).

In a representative embodiment, FIG. 2 shows a wireless data transfer system 100 in which data can be transferred wirelessly between the hard disks 115,165 on a system comprising two computers wirelessly coupled to each other. In addition, data can be simultaneously transferred wirelessly between the hard disk of a source computer and the hard disks of multiple target computers. Using additional wireless data transfer devices 105,155 as needed, data can be simultaneously transferred wirelessly between a source hard disk, for example first hard disk 115, and multiple target hard disks, for example multiple second hard disks 165.

Figure 3:
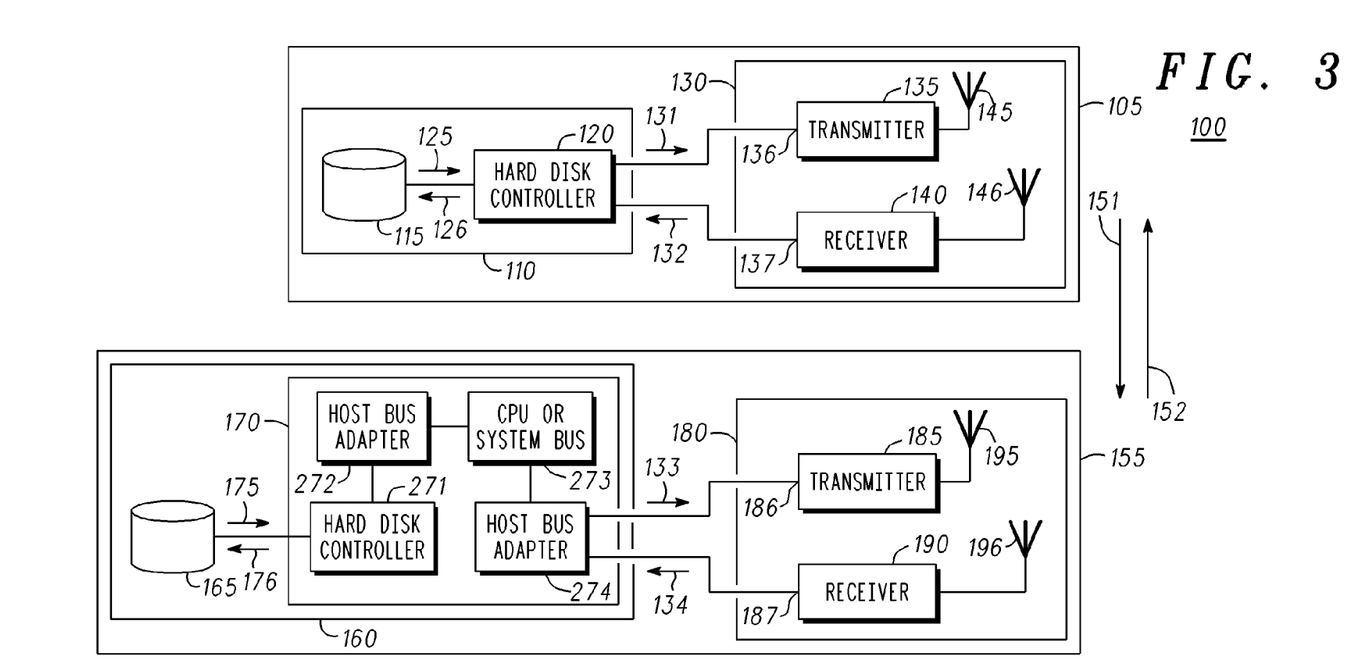
FIG. 3 is a block diagram of yet another wireless data transfer system as described in various representative embodiments.

FIG. 3 is a block diagram of yet another wireless data transfer system 100 as described in various representative embodiments. The wireless data transfer system 100 of FIG. 3 comprises the first wireless data transfer device 105 of FIG. 1 and the second wireless data transfer device 155 of FIG. 2. The internal coupling of the first wireless data transfer device 105 of FIG. 3 is as it was described with respect to FIG. 1, and the internal coupling of the second wireless data transfer device 155 of FIG. 3 is as it was described with respect to FIG. 2.

As in FIG. 1, when the first wireless data transfer device 105 of FIG. 3 is in a data transmission mode, the first hard disk interface 120, which in FIG. 3 becomes first hard disk controller 120, retrieves first read data 125 from the first hard disk 115 and creates a first bit serial signal 131 from the retrieved first read data 125. The created first bit serial signal 131 conforms to a protocol selected from the group comprising the serial advanced technology attachment (SATA) protocol and the serial attached small computer system interface (SAS) protocol. Operating at a selected carrier frequency greater than 50 GHz and an effective isotropic radiated power level less than or equal to 40 dBm, the first transmitter 135 receives the first bit serial signal 131 from the first hard disk controller 120 at the first transmitter input 136. The first transmitter 135 modulates the first bit serial signal 131 using amplitude shift keying modulation to substantially generate directly a first signal 151 and then transmits the first signal 151 via the first transmitter antenna 145 which is coupled to the output of the first transmitter 135.

As in FIGS. 1 and 2, when the second wireless data transfer device 155 of FIG. 3 is in a data reception mode operating at the same carrier frequency as the first transmitter 135, the second receiver 190 receives the first signal 151 from the first wireless data transfer device 105 via the second receiver antenna 196 and demodulates the first signal 151 using amplitude shift keying demodulation to substantially create directly a fourth bit serial signal 134 from the first signal 151. The created fourth bit serial signal 134 conforms to the selected protocol (SATA or SAS). In FIG. 3 as in FIG. 2, the second second-host bus adapter 274 in the second hard disk interface 170 receives the fourth bit serial signal 134 from the second receiver 190 at the second receiver output 187. The fourth bit serial signal 134 is transferred to the second CPU 273 by the second second-host bus adapter 274; the fourth bit serial signal 134 is transferred to the second hard disk controller 271 via the first second-host bus adapter 272; and the second hard disk controller 271 appropriately modifies the fourth bit serial signal 134 for storage creating, thereby, second write data 176. Second write data 176 is then stored on the second hard disk 165. As with the embodiments of FIGS. 1 and 2, the created fourth bit serial signal 134 conforms to the selected protocol (SATA or SAS).

As in FIG. 2, when the second wireless data transfer device 155 of FIG. 3 is in a data transmission mode, the second hard disk controller 271 retrieves second read data 175 from the second hard disk 165 and creates a third bit serial signal 133 from the retrieved second read data 175; the third bit serial signal 133 is transferred to the second CPU 273 via the first second-host bus adapter 272; and the third bit serial signal 133 is transferred from the second CPU 273 via the second second-host bus adapter 274 to the second transmitter 185 at the second transmitter input 186. As with the second wireless data transfer device 155 of FIGS. 1 and 2, the created third bit serial signal 133 of FIG. 3 conforms to a protocol selected from the group comprising the serial advanced technology attachment (SATA) protocol and the serial attached small computer system interface (SAS) protocol, and the second transmitter 185 operates at a selected carrier frequency greater than 50 GHz and an effective isotropic radiated power level less than or equal to 40 dBm. The second transmitter 185 receives the third bit serial signal 133 from the second hard disk interface 170 at the second transmitter input 186. The second transmitter 185 modulates the third bit serial signal 133 using amplitude shift keying modulation to substantially generate directly a second signal 152 and then transmits the second signal 152 via the second transmitter antenna 195 which is coupled to the output of the second transmitter 185.

As in FIG. 1, when the first wireless data transfer device 105 is in a data reception mode operating at the same carrier frequency as the second transmitter 185, the first receiver 140 receives the second signal 152 from the second wireless data transfer device 155 via the first receiver antenna 146 and demodulates the second signal 152 using amplitude shift keying demodulation to substantially create directly a second bit serial signal 132 from the second signal 152. The created second bit serial signal 132 conforms to the selected protocol (SATA or SAS). The first hard disk controller 120 receives the second bit serial signal 132 from the first receiver 140 at the first receiver output 137. The first hard disk controller 120 appropriately modifies the second bit serial signal 132 for storage creating, thereby, first write data 126. First write data 126 is then stored on the first hard disk 115.

In representative embodiments wherein the first hard disk interface 120 is first hard disk controller 120, FIG. 3 shows wireless data transfer systems 100 in which data can be transferred wirelessly between hard disks on various systems of wirelessly coupled data storage devices 115,165. Such systems could include, for example, (1) a digital video recorder (DVR) wirelessly coupled to a computer, (2) an external hard disk wirelessly coupled to a computer, (3) a cell phone wirelessly coupled to a computer, (4) a video camera wirelessly coupled to a computer, and the like. In addition, data can be simultaneously transferred wirelessly between a source hard disk and multiple target hard disks for, among others, any of the above combinations. Using additional wireless data transfer devices 105,155 as needed, data can be simultaneously transferred wirelessly between a source storage device, for example first storage device 115, and multiple target storage devices, for example multiple second storage devices 165.

Also, data can be simultaneously transferred wirelessly between a source storage device, for example second storage device 165, and multiple target storage devices, for example multiple first storage devices 115.

Figure 4:
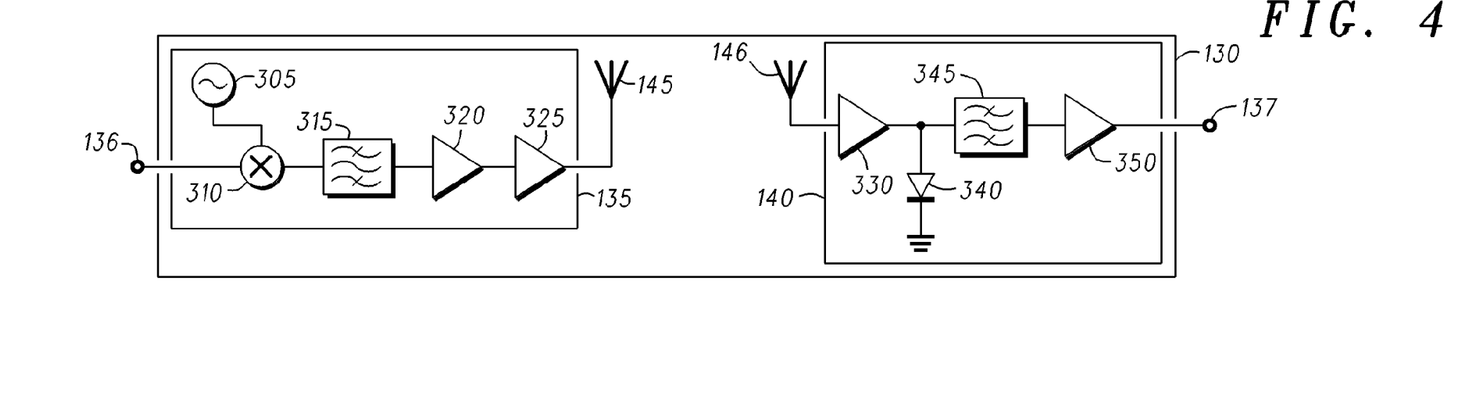
FIG. 4 is a more detailed block diagram of the first communication module of FIGS. 1, 2, and 3.

FIG. 4 is a more detailed block diagram of the first communication module 130 of FIGS. 1, 2, and 3. A similar block diagram would describe the second communication modules 180 of FIGS. 1, 2, and 3. In FIG. 4, the first communication module 130 comprises the first transmitter 135, the first transmitter antenna 145, the first receiver 140, and the first receiver antenna 146. The input of the first transmitter 135 is located at first transmitter input 136, and the output of the first receiver 140 is located at first receiver output 137. The first transmitter 135 comprises a local oscillator 305, a sub-harmonic mixer 310, a transmitter filter 315, a transmitter amplifier 320, and a frequency multiplier 325. The first receiver 140 comprises an input amplifier 330 which includes at its input a low noise amplification stage, a detector 340 shown in FIG. 4 as a diode coupled between the signal line and ground, a receiver filter 345, and a receiver output amplifier 350.

In transmission mode, a local-oscillator signal can be generated, for example, at a frequency of 15 GHz in the first transmitter 135 by the local oscillator 305. The local-oscillator signal at 15 GHz and the input signal (first bit serial signal 131) at the first transmitter input 136 are mixed together by the sub-harmonic mixer 310 which can also multiply the internal high-frequency carrier by a factor of, for example, two. The resulting signal is a high-frequency carrier at 30 GHz using amplitude shift keying modulation to substantially create directly a first signal 151 from the input signal (first bit serial signal 131) received at the first transmitter input 136. The modulated first bit serial signal 131 is passed through the transmitter filter 315 to remove any extraneous signals. The transmitter amplifier 320 then amplifies the signal, and the frequency multiplier 325 can multiply the carrier by a factor of, for example, two to obtain a 60 GHz carrier. The resulting first signal 151 is then transmitted using the first transmitter antenna 145.

In reception mode, the second signal 152 received by the first receiver 140 via the first transmitter antenna 145 is amplified by the input amplifier 330. As indicated above, the input amplifier 330 preferably includes a low noise amplification stage at its input. The amplified second signal 152 is then demodulated using amplitude shift keying demodulation to substantially create directly a second bit serial signal 132. The detected second bit serial signal 132 is then passed through the receiver filter 345 to additionally remove noise and any extraneous signals and subsequently amplified by the receiver output amplifier 350 before appearing at the first receiver output 137. Other embodiments of the first communication module 130 can also be used with the first wireless data transfer device 105, and equivalently with the second wireless data transfer device 155.

Figure 5:
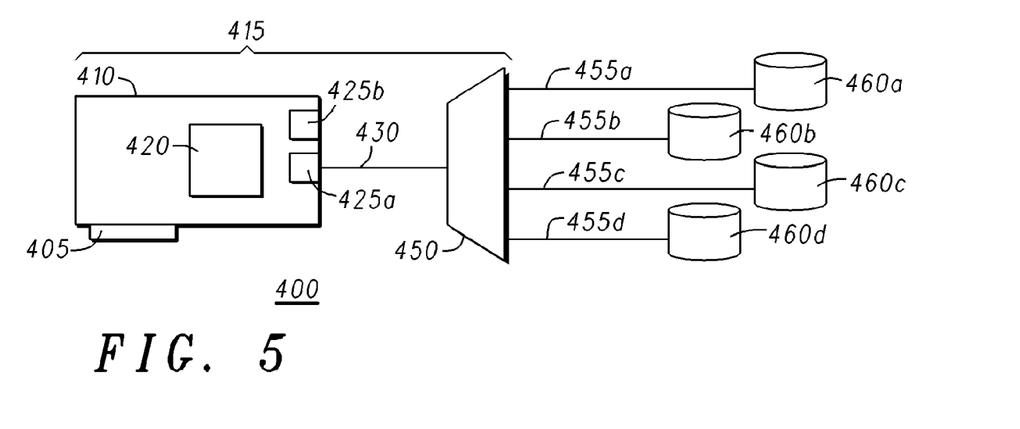
FIG. 5 is a block diagram of a switch system having a port multiplier configured for use with the wireless data transfer systems of FIGS. 1, 2, and 3.

FIG. 5 is a block diagram of a switch system 400 having a port multiplier 450 configured for use with the wireless data transfer systems 100 of FIGS. 1, 2, and 3. In FIG. 5, the switch system 400 comprises a host-bus multiple hard disk adapter 415, a first port interconnect 455a, a second port interconnect 455b, a third port interconnect 455c, a fourth port interconnect 455d, a first port hard disk 460a, a second port hard disk 460b, a third port hard disk 460c, and a fourth port hard disk 460d. The host-bus multiple hard disk adapter 415 comprises a plug 405, a housing 410, an integrated circuit 420, multiple output connections 425a,425b, a communication line 430, and the port multiplier 450. The host-bus multiple hard disk adapter 415 can be used to replace the first first-host bus adapter 222 of FIG. 2 or the first second-host bus adapter 272 of FIGS. 2 and 3.

The plug 405 can be used to couple to the appropriate CPU 223,273 or appropriate system bus 223,273. Control electronics can be provided by the integrated circuit 420 which also could include the first hard disk controller 221 (or the second hard disk controller 271). One of the output connections 425a,425b couples to a communication line 430 which in turn couples to the port multiplier 450. The port multiplier 450 is configured to switch between one of the port interconnects 455a,455b,455c,455d each of which separately couples to one of the multiple port hard disks 460a,460b,460c,460d. A signal from the integrated circuit 420 can be used to instruct the port multiplier 450 as to which port hard disk 460a,460b, 460c,460d to couple to the plug 405 and thereby to the appropriate CPU 223,273 or appropriate system bus 223,273. Since SATA provides point-to-point connection topology (each source is coupled to only one destination at any given time), it provides a dedicated bandwidth which some other wireless technologies such as USB do not. Each channel has the ability to work independently so that there is no contention between disks and thus no sharing of interface bandwidth. This interconnection strategy also negates the need for master/slave jumper settings on devices. In addition, there is no arbitration/collision overhead. High performance can be maintained by the ability to match transmission line impedances to the termination points, i.e., to the port hard disks.

Figure 6:
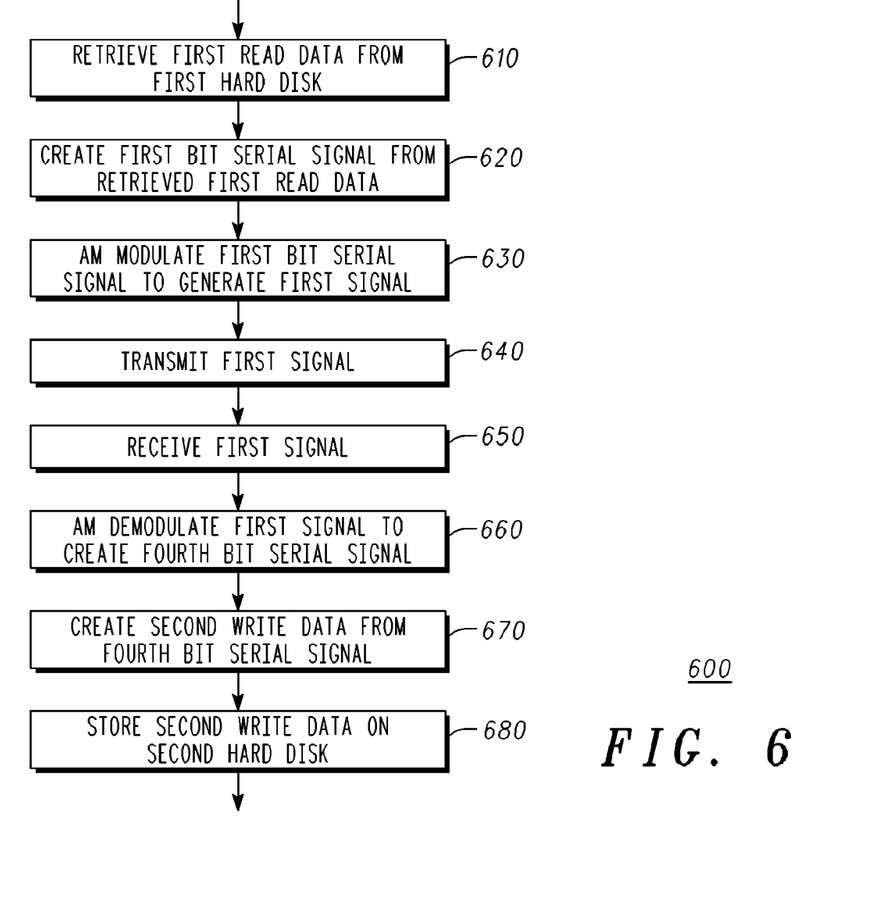
FIG. 6 is a flow chart of a method for the wireless transfer of data between the first and the second wireless data transfer devices of FIGS. 1, 2, and 3.

FIG. 6 is a flow chart of a method 600 for the wireless transfer of data between the first and the second wireless data transfer devices 105,155 of FIGS. 1, 2, and 3. The following discussion will be in terms of transferring first read data 125 from the first hard disk 115 of the first wireless data transfer device 105 to the second hard disk 165 of the second wireless data transfer device 155. As will be understood by one of ordinary skill in the art, the discussion is transferable to the case of transferring second read data 175 from the second hard disk 165 of the second wireless data transfer device 155 to the first hard disk 115 of the first wireless data transfer device 105.

In block 610, the first hard disk interface 120 retrieves first read data 125 from the first hard disk 115. Block 610 then transfers control to block 620.

In block 620, a first bit serial signal 131 is created from the retrieved first read data 125. The created first bit serial signal 131 conforms to a protocol selected from the group comprising the serial advanced technology attachment (SATA) protocol and the serial attached small computer system interface (SAS) protocol. Block 620 then transfers control to block 630.

In block 630, while operating at a selected carrier frequency greater than 50 GHz and an effective isotropic radiated power level less than or equal to 40 dBm, the first transmitter 135 receives the first bit serial signal 131 from the first hard disk interface 120 at the first transmitter input 136. The first transmitter 135 modulates the first bit serial signal 131 using amplitude shift keying modulation to substantially generate directly a first signal 151. Block 630 then transfers control to block 640.

In block 640, the first transmitter 135 transmits the first signal 151 via the first transmitter antenna 145 which is coupled to the output of the first transmitter 135. Block 640 then transfers control to block 650.

In block 650, the second receiver 190 receives the first signal 151 from the first wireless data transfer device 105 via the second receiver antenna 196. Block 650 then transfers control to block 660.

In block 660, the second receiver 190 demodulates the first signal 151 using amplitude shift keying demodulation to substantially create directly a fourth bit serial signal 134 from the first signal 151. The created fourth bit serial signal 134 conforms to the selected protocol (SATA or SAS). Block 660 then transfers control to block 670.

In block 670, the second hard disk interface 170 receives the fourth bit serial signal 134 from the second receiver 190 at second receiver output 187. The second hard disk interface 170 appropriately modifies the fourth bit serial signal 134 for storage creating, thereby, second write data 176. Block 670 then transfers control to block 680.

In block 680, the second write data 176 is stored on the second hard disk 165. Block 680 then terminates the process.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming an information-processing apparatus (e.g., the CPUs 223,273 of FIG. 2 among others) to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

In addition to RF transmission/reception, optical transfer and the like can also be used. Techniques described herein provide the capability of transferring large amounts of data at high speeds from/to the hard disks of portable devices and/or set-top boxes, computers, monitors, DVD players, and the like. The speed of data transmission is effectively limited only by the read/write speed of the hard disk.

The systems described herein can be used, for example, to download movies from a portable hard disk to a digital video recorder (DVR) or vice versa. A manufacturer of, for example, a video game system can download several initial trial games and videos to the game system prior to shipping without having to connect a cable to each device. Further, a single source wireless data transfer device can be used to download one or more games/videos to multiple target game systems prior to shipping, again without having to connect a cable to each device. A wireless SATA connection provides the ability to transfer data at distances greater than would be possible with a hard wired SATA system, i.e., at distances greater than two meters.

In a representative embodiment, a wireless data transfer system 100 comprises a first wireless data transfer device 105. The first wireless data transfer device 105 comprises a first hard disk 115, a first hard disk interface 120, and a first communication module 130 configured to operate at a selected carrier frequency greater than 50 GHz. The first hard disk interface 120 is configured to retrieve first read data 125 from the first hard disk 115 and is configured to create a first bit serial signal 131 from the retrieved first read data 125. The first bit serial signal 131 conforms to a protocol selected from the group consisting of serial advanced technology attachment (SATA) protocol and serial attached small computer system interface (SAS) protocol. The first communication module 130 comprises a first transmitter 135. The first transmitter 135 is configured to operate at an effective isotropic radiated power level less than or equal to 40 dBm, is configured to receive the first bit serial signal 131 from the first hard disk interface 120, is configured to modulate the first bit serial signal 131 using amplitude shift keying modulation to substantially create directly a first signal 151, and is configured to transmit the first signal 151.

In another representative embodiment, a wireless data transfer system 100 comprises a first wireless data transfer device 105. The first wireless data transfer device 105 comprises a first hard disk 115, a first hard disk interface 120, and a first communication module 130 configured to operate at a selected carrier frequency greater than 50 GHz. The first communication module 130 comprises a first receiver 140 configured to receive and to demodulate a second signal 152 using amplitude shift keying demodulation to substantially create directly a second bit serial signal 132 from the second signal 152. The second bit serial signal 132 conforms to a protocol selected from the group consisting of serial advanced technology attachment (SATA) protocol and serial attached small computer system interface (SAS) protocol. The first hard disk interface 120 is configured to receive the second bit serial signal 132 from the first receiver 140 and is configured to create first write data 126 from the received second bit serial signal 132. And the first hard disk interface 120 is configured to store the first write data 126 on the first hard disk 115.

In still another representative embodiment, a method 600 for the wireless transfer of data comprises retrieving first read data 125 from a first hard disk 115 and creating a first bit serial signal 131 from the retrieved first read data 125. The first wireless data transfer device 105 comprises the first hard disk 115, and the created first bit serial signal 131 conforms to a protocol selected from the group comprising the serial advanced technology attachment (SATA) protocol and the serial attached small computer system interface (SAS) protocol. While operating at a selected carrier frequency greater than 50 GHz and an effective isotropic radiated power level less than or equal to 40 dBm, the method 600 further comprises modulating the first bit serial signal 131 using amplitude shift keying modulation to substantially generate directly a first signal 151 and wirelessly transmitting the first signal 151.

In yet another representative embodiment, the method 600 for the wireless transfer of data further comprises wirelessly receiving the first signal 151 from the first wireless data transfer device 105 by a second wireless data transfer device 155, demodulating the first signal 151 using amplitude shift keying demodulation to substantially create directly a fourth bit serial signal 134 from the first signal 151 by the second wireless data transfer device 155, appropriately modifying the fourth bit serial signal 134 for storage on a second hard disk 165 as second write data 176, and storing the second write data 176 on the second hard disk 165. The created fourth bit serial signal 134 conforms to the selected protocol (SATA or SAS), and the second wireless data transfer device 155 comprises the second hard disk 165.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A wireless data transfer system comprising:
  a first wireless data transfer device, comprising:
    a first hard disk;
    a first hard disk interface, wherein the first hard disk interface is configured to retrieve first read data from the first hard disk and is configured to create a first bit serial signal from the retrieved first read data, wherein the first bit serial signal conforms to a protocol selected from the group consisting of serial advanced technology attachment (SATA) protocol and serial attached small computer system interface (SAS) protocol; and a first communication module configured to operate at a selected carrier frequency greater than 50 GHz, comprising:

a first transmitter configured to operate at an effective isotropic radiated power level less than or equal to 40 dBm, configured to receive the first bit serial signal from the first hard disk interface, configured to modulate the first bit serial signal using amplitude shift keying modulation to substantially create directly a first signal, and configured to transmit the first signal.

2. The wireless data transfer system as recited in claim 1, wherein the first communication module further comprises:

a first receiver configured to receive and to demodulate a second signal using amplitude shift keying demodulation to substantially create directly a second bit serial signal from the second signal, wherein the second bit serial signal conforms to the selected protocol, wherein the first hard disk interface is configured to receive the second bit serial signal from the first receiver and is configured to create first write data from the received second bit serial signal, and wherein the first hard disk interface is configured to store the first write data on the first hard disk.

3. The wireless data transfer system as recited in claim 1, wherein the first wireless data transfer device is selected from the group consisting of a digital video recorder (DVR), an external hard disk, a cell phone, and a video camera.

4. The wireless data transfer system as recited in claim 1, wherein the first hard disk is located on a computer.

5. The wireless data transfer system as recited in claim 4, wherein the first hard disk interface comprises a first hard disk controller coupled to the first hard disk, a first first-host bus adapter coupled to the first hard disk controller, a first central processing unit or a first system bus coupled to the first first-host bus adapter, and a second first-host bus adapter coupled to the first central processing unit or the first system bus and coupled to the first transmitter.

6. The wireless data transfer system as recited in claim 5, wherein the first first-host bus adapter is host-bus multiple hard disk adapter, wherein the host-bus multiple hard disk adapter is configured to control multiple first hard disks.

7. The wireless data transfer system as recited in claim 1, further comprising:

a second wireless data transfer device, comprising:

a second hard disk;

a second hard disk interface; and a second communication module configured to operate at the selected carrier frequency, comprising:

a second receiver configured to receive and to demodulate the first signal using amplitude shift keying demodulation to substantially create directly a fourth bit serial signal from the first signal, wherein the fourth bit serial signal conforms to the selected protocol, wherein the second hard disk interface is configured to receive the fourth bit serial signal from the second receiver and is configured to create second write data from the received fourth bit serial signal, and wherein the second hard disk interface is configured to store the second write data on the second hard disk.

8. The wireless data transfer system as recited in claim 7, wherein the second communication module further comprises:

a second transmitter configured to operate at an effective isotropic radiated power level less than or equal to 40 dBm, wherein the second hard disk interface is configured to retrieve second read data from the second hard disk and is configured to create a third bit serial signal from the retrieved second read data, wherein the second bit serial signal conforms to the selected protocol, and wherein the second transmitter is configured to receive the third bit serial signal from the second hard disk interface, is configured to modulate the third bit serial signal using amplitude shift keying modulation to substantially create directly a second signal, and is configured to transmit the second signal; and wherein the first communication module further comprises:

a first receiver configured to receive and to demodulate the second signal using amplitude shift keying demodulation to substantially create directly a second bit serial signal from the second signal, wherein the second bit serial signal conforms to the selected protocol, wherein the first hard disk interface is configured to receive the second bit serial signal from the first receiver and is configured to create first write data from the received second bit serial signal, and wherein the first hard disk interface is configured to store the first write data on the first hard disk.

9. The wireless data transfer system as recited in claim 7, wherein the first wireless data transfer device is selected from the group consisting of a digital video recorder (DVR), an external hard disk, a cell phone, and a video camera and wherein the second hard disk is located on a computer.

10. The wireless data transfer system as recited in claim 9, wherein the first wireless data transfer device transmits first read data in the first signal to multiple second wireless data transfer devices for storage as second write data on the second hard disk of each of the multiple second wireless data transfer devices.

11. The wireless data transfer system as recited in claim 7 wherein the first hard disk is located on a computer and wherein the second wireless data transfer device is selected from the group consisting of a digital video recorder (DVR), an external hard disk, a cell phone, and a video camera.

12. The wireless data transfer system as recited in claim 11, wherein the first wireless data transfer device transmits first read data in a first signal to multiple second wireless data transfer devices for storage as second write data on the second hard disks of each of the multiple second wireless data transfer devices.

13. The wireless data transfer system as recited in claim 7, wherein the first wireless data transfer device is selected from the group consisting of a digital video recorder (DVR), an external hard disk, a cell phone, and a video camera and wherein the second wireless transfer device is selected from the group consisting of a digital video recorder (DVR), an external hard disk, a cell phone, and a video camera.

14. The wireless data transfer system as recited in claim 13, wherein the first wireless data transfer device transmits first read data in the first signal to multiple second wireless data transfer devices for storage as second write data on the second hard disk of each of the multiple second wireless data transfer devices.

15. The wireless data transfer system as recited in claim 7, wherein the first hard disk is located on a computer and wherein the second hard disk is located on another computer.

16. The wireless data transfer system as recited in claim 15, wherein the first wireless data transfer device transmits first read data in the first signal to multiple second wireless data transfer devices for storage as second write data on the second hard disk of each of the multiple second wireless data transfer devices.

17. A wireless data transfer system comprising:
a first wireless data transfer device, comprising:
   a first hard disk;
   a first hard disk interface; and
   a first communication module configured to operate at a selected carrier frequency greater than 50 GHz, comprising:
      a first receiver configured to receive and to demodulate a second signal using amplitude shift keying demodulation to substantially create directly a second bit serial signal from the second signal, wherein the second bit serial signal conforms to a protocol selected from the group consisting of serial advanced technology attachment (SATA) protocol and serial attached small computer system interface (SAS) protocol, wherein the first hard disk interface is configured to receive the second bit serial signal from the first receiver and is configured to create first write data from the received second bit serial signal, and wherein the first hard disk interface is configured to store the first write data on the first hard disk.

18. The wireless data transfer system as recited in claim 17, wherein the first wireless data transfer device is selected from the group consisting of a digital video recorder (DVR), an external hard disk, a cell phone, and a video camera.

19. The wireless data transfer system as recited in claim 17, wherein the first hard disk is located on a computer.

20. A method for the wireless transfer of data, comprising:
retrieving first read data from a first hard disk, wherein a first wireless data transfer device comprises the first hard disk;
creating a first bit serial signal from the retrieved first read data, wherein the created first bit serial signal conforms to a protocol selected from the group comprising the serial advanced technology attachment (SATA) protocol and the serial attached small computer system interface (SAS) protocol;
while operating at a selected carrier frequency greater than 50 GHz and an effective isotropic radiated power level less than or equal to 40 dBm, modulating the first bit serial signal using amplitude shift keying modulation to substantially generate directly a first signal; and
wirelessly transmitting the first signal.

21. The method as recited in claim 20, further comprising:
by a second wireless data transfer device, wirelessly receiving the first signal from the first wireless data transfer device;
by the second wireless data transfer device, demodulating the first signal using amplitude shift keying demodulation to substantially create directly a fourth bit serial signal from the first signal, wherein the created fourth bit serial signal conforms to the selected protocol (SATA or SAS);
appropriately modifying the fourth bit serial signal for storage on a second hard disk as second write data, wherein the second wireless data transfer device comprises the second hard disk; and
storing the second write data on the second hard disk.

* * * * *